United States Patent
Daigre et al.

(10) Patent No.: US 7,089,818 B2
(45) Date of Patent: Aug. 15, 2006

(54) SPEED SENSOR FLANGE ASSEMBLIES

(75) Inventors: Richard Daigre, Hopkinsville, KY (US); Harvey C. White, Nashville, TN (US)

(73) Assignee: White Drive Products, Inc., Hopkinsville, KY (US)

( * ) Notice: Subject to any disclaimer, the term of this patent is extended or adjusted under 35 U.S.C. 154(b) by 102 days.

(21) Appl. No.: 10/474,110

(22) PCT Filed: Apr. 8, 2002

(86) PCT No.: PCT/US02/11056

§ 371 (c)(1),
(2), (4) Date: Oct. 7, 2003

(87) PCT Pub. No.: WO02/082098

PCT Pub. Date: Oct. 17, 2002

(65) Prior Publication Data

US 2004/0134277 A1 Jul. 15, 2004

Related U.S. Application Data

(60) Provisional application No. 60/282,038, filed on Apr. 7, 2001.

(51) Int. Cl.
G01M 19/00 (2006.01)
G01P 1/00 (2006.01)
G01P 3/44 (2006.01)

(52) U.S. Cl. .................................. 73/866.5; 73/494

(58) Field of Classification Search ............. 73/866.5, 73/493–494, 865.9, 168
See application file for complete search history.

(56) References Cited

U.S. PATENT DOCUMENTS

| | | | | |
|---|---|---|---|---|
| 4,907,456 A | * | 3/1990 | Rozelle | 73/866.5 X |
| 4,911,000 A | * | 3/1990 | Takase et al. | 73/118.1 |
| 5,063,346 A | * | 11/1991 | Hogan et al. | 324/173 |
| 5,345,829 A | * | 9/1994 | Yamauchi et al. | 73/865.9 |
| 5,408,894 A | * | 4/1995 | Henson | 73/866.5 |
| 5,488,860 A | * | 2/1996 | Speck et al. | 73/168 |
| 5,495,758 A | * | 3/1996 | Griffen et al. | 73/493 |
| 6,109,120 A | * | 8/2000 | Robinson et al. | 73/866.5 |
| 6,227,703 B1 | * | 5/2001 | DiMatteo et al. | 73/866.5 X |
| 6,362,719 B1 | * | 3/2002 | Osmer et al. | 338/2 |
| 6,411,082 B1 | * | 6/2002 | Glasson | 324/207.25 |
| 6,453,742 B1 | * | 9/2002 | White et al. | 73/494 |
| 6,534,979 B1 | * | 3/2003 | Wineland | 73/866.5 X |

FOREIGN PATENT DOCUMENTS

| | | | | |
|---|---|---|---|---|
| DE | 3912431 C2 | * | 7/1999 | |
| EP | 443939 A | * | 8/1991 | |
| EP | 387459 B1 | * | 11/1992 | |
| EP | 813066 A | * | 12/1997 | |
| JP | 04116073 A | * | 4/1992 | |
| JP | 08184603 A | * | 7/1996 | |
| WO | WO 9630769 A1 | * | 10/1996 | |

* cited by examiner

*Primary Examiner*—Thomas P. Noland

(57) ABSTRACT

A sensor unit for a rotating shaft of a device includes a body having an axial opening and a second opening. The axial opening receives the rotating shaft and contacts an outer surface of the rotating shaft to precisely and repeatedly radially align a sensor to the shaft. The second opening receives the sensor.

25 Claims, 5 Drawing Sheets

SPEED SENSOR FLANGE ASSEMBLIES

This application is a section 371 of PCT/US02/11056, filed on Apr. 8, 2002 which claims the benefit of provisional application Ser. No. 60/282,038 filed Apr. 7, 2001.

FIELD TO WHICH THE INVENTION RELATES

This invention relates to speed/direction sensor assembly for consistent inclusion in a device having a rotary shaft.

BACKGROUND OF THE INVENTION

Hydraulic motors and other units having a rotary output are frequently used with devices for which information as to the positioning and/or speed and/or direction of rotation is useful. Examples include robotic arms, salt spreading units, scissor lifts, winches and power steering units. Some units utilize sensors deep within the housing of the units together with specialized shafts. The Parker hydraulic motor with its slotted shaft and inductive sensor is an example. Other units utilize sensors in specially machined intermediate members between a device and its associated motor. The White Hydraulics motor with cast cap having a screwed in separate sensor is an example. In this motor (FIG. 11) a screw-in sensor 90 is provided with access to, and adjustment of, the clearance 92 through an enlarged dust cap 93 in original and subsequent installations. Typically it is necessary to have a separated power unit to do this. Additional units use specialized housings with multiple sensors. The Ross gear commutation apparatus disclosed in U.S. Pat. No. 4,767,292, Electrical Commutation Apparatus, is such a unit.

These units necessitate complicated housings, additional individual manufactured parts and/or additional components. These add to the complexity of the overall device, increasing manufacturing maintenance and other costs relative to the hydraulic units. The units typically require specialized integral design and/or relatively significant individual adjustments. The units also typically have to be removed and rebuilt if there are sensor problems. The units are thus costly to both build and maintain.

OBJECTS AND SUMMARY OF THE INVENTION

It is an object of this invention to simplify the sensors utilized with hydraulic motors.

It is another object of this invention to facilitate the assembly of sensor units.

It is still a further object to provide for a self aligning sensor unit.

It is a further object to protect the integrity of sensor units.

It is yet another object of this invention to facilitate the repair and/or replacement of sensor units.

It is another object of this invention to allow for differing types of sensors in a single basic design.

It is another object of this invention to allow a single sensor to be utilized in differing units.

It is a further object of this invention to simplify the utilization of sensors in rotary devices.

Other objects and a further understanding of the invention may be had by referring to the drawings in which:

DETAILED DESCRIPTION OF THE INVENTION

Figure 1:
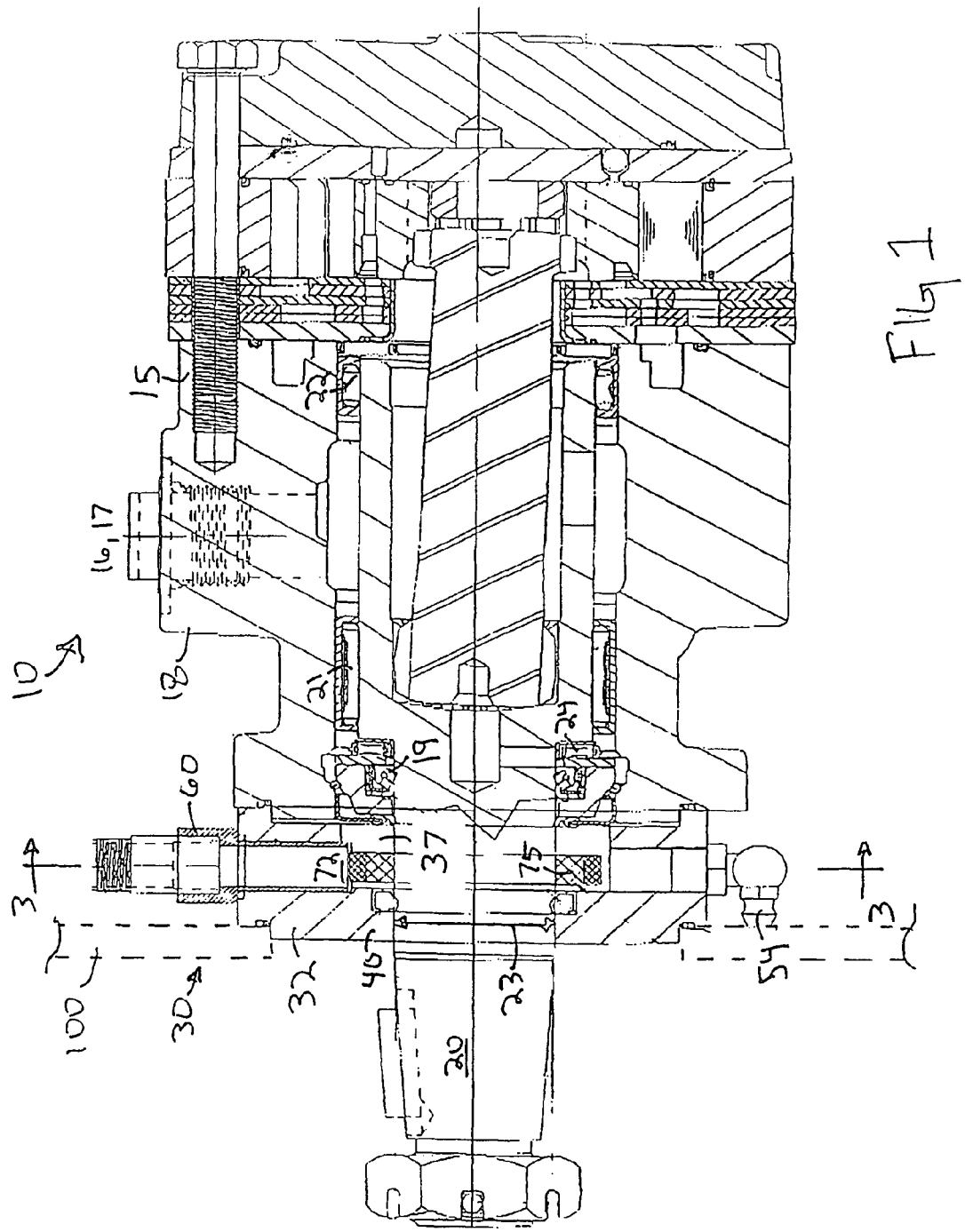
FIG. 1 is a longitudinal cross-sectional view of a hydraulic pressure device incorporating the invention of the application.
Figure 2:
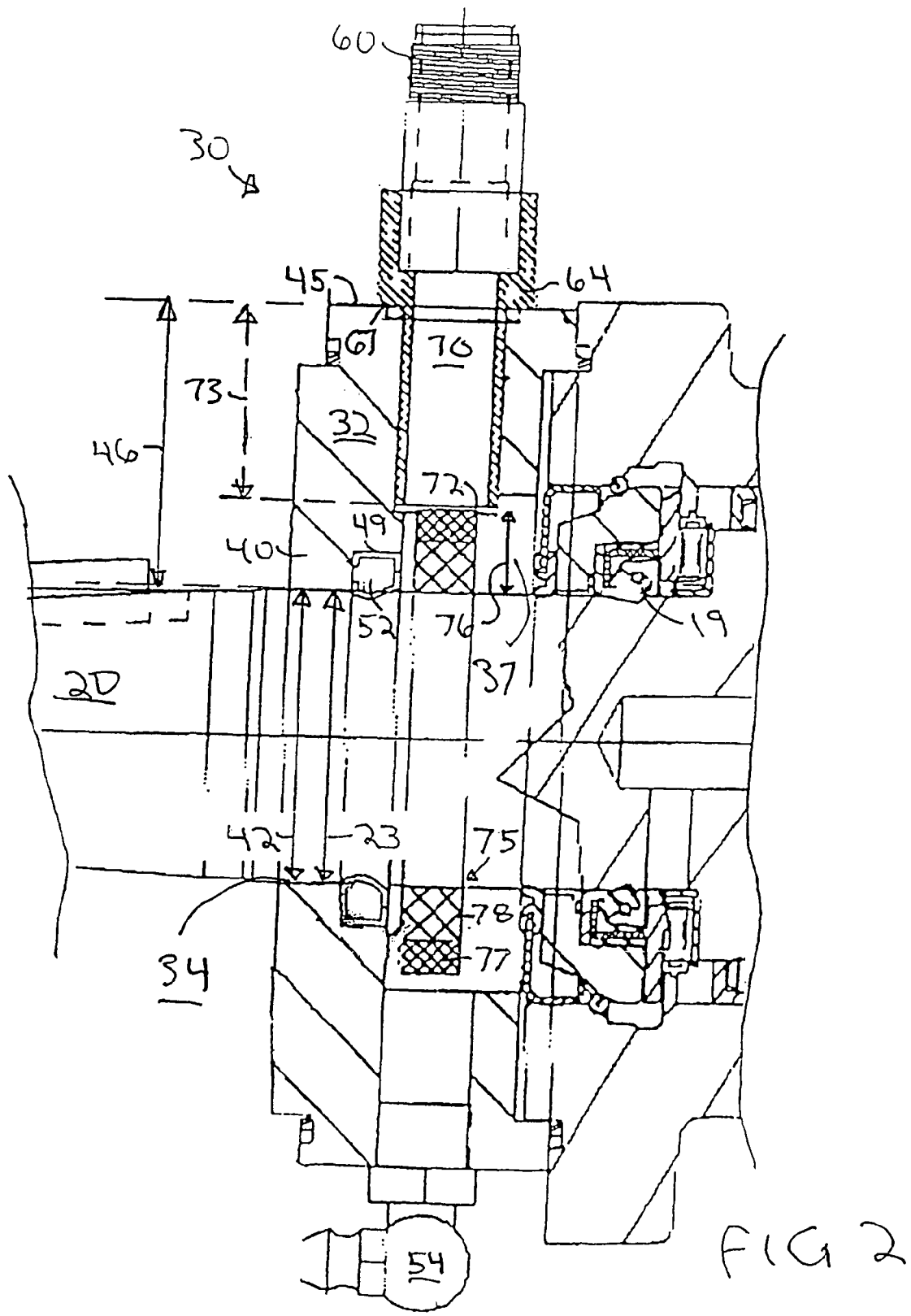
FIG. 2 is a partial enlargement of FIG. 1.
Figure 3:
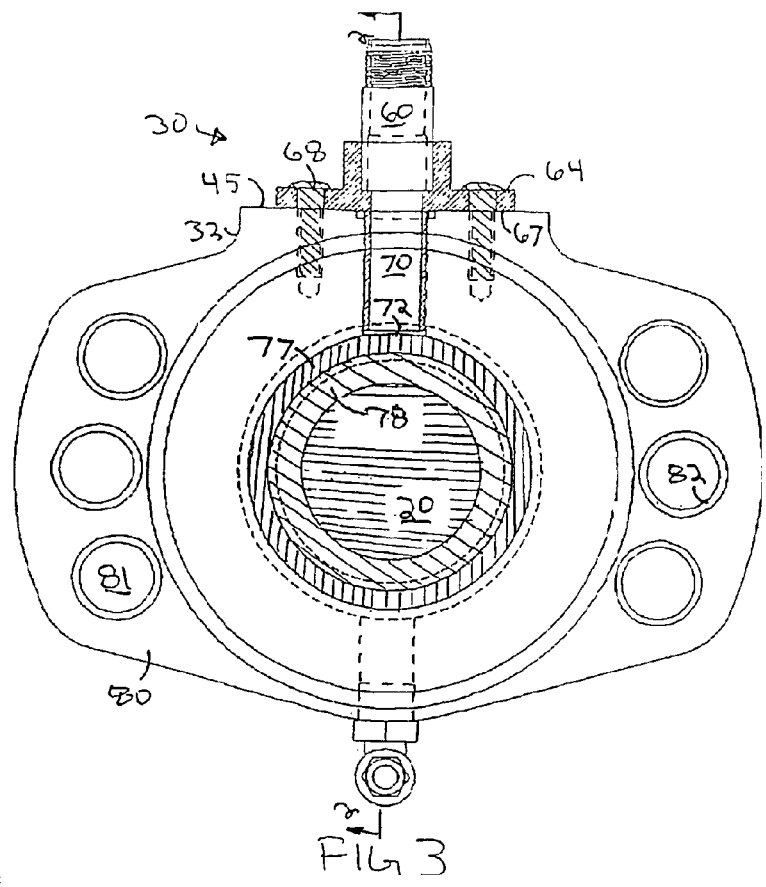
FIG. 3 is a cross-sectional view of the sensor unit of the hydraulic motor of FIG. 1 taken substantially along the lines 3—3 of such FIG.
Figure 4:
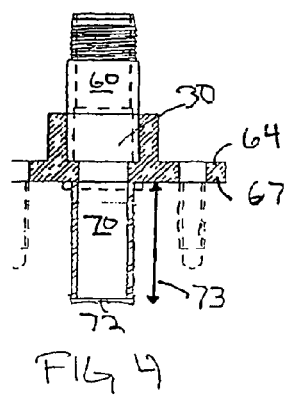
FIG. 4 is a side view of the sensor of FIG. 2.
Figure 6:
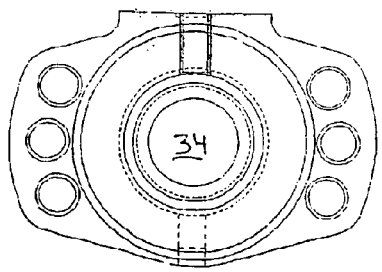
FIG. 6 is a cross-sectional view of the sensor housing of FIG. 2.
Figure 5:
FIG. 5 is a top view of the sensor of FIG. 3.
Figure 10:
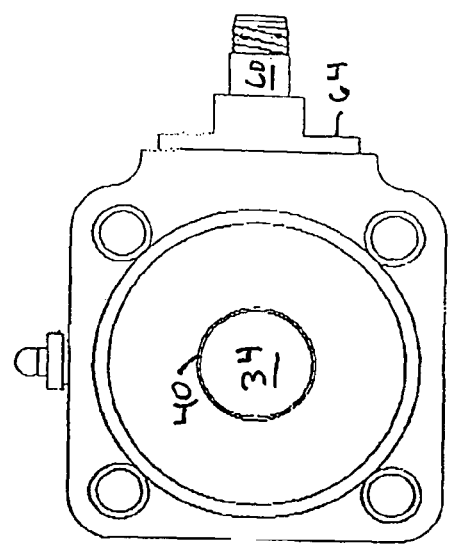
FIGS. 7–10 are respective side, front, cross-sectional and back views of an alternate sensor arrangement; and, FIG. 11 is a drawing of a prior art White screw in sensor design.
Figure 9:
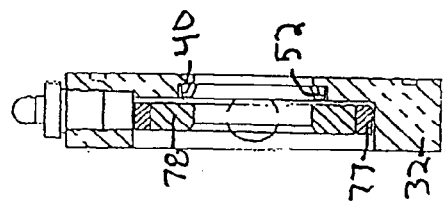
Figure 8:
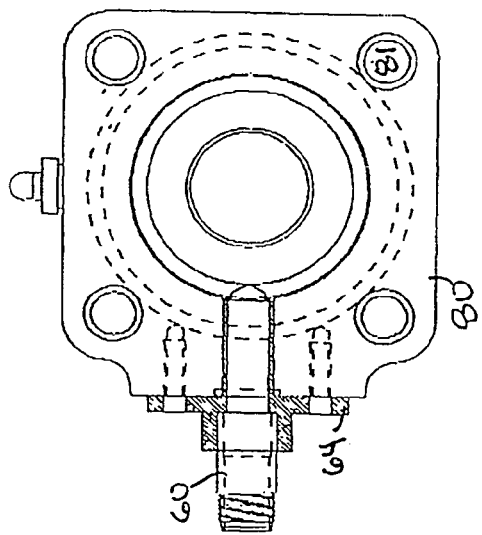
Figure 7:
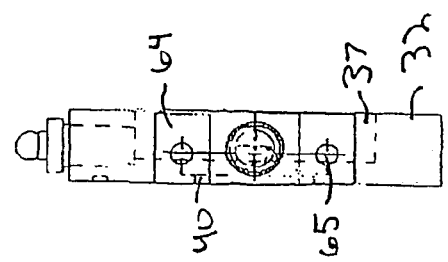
Figure 11:
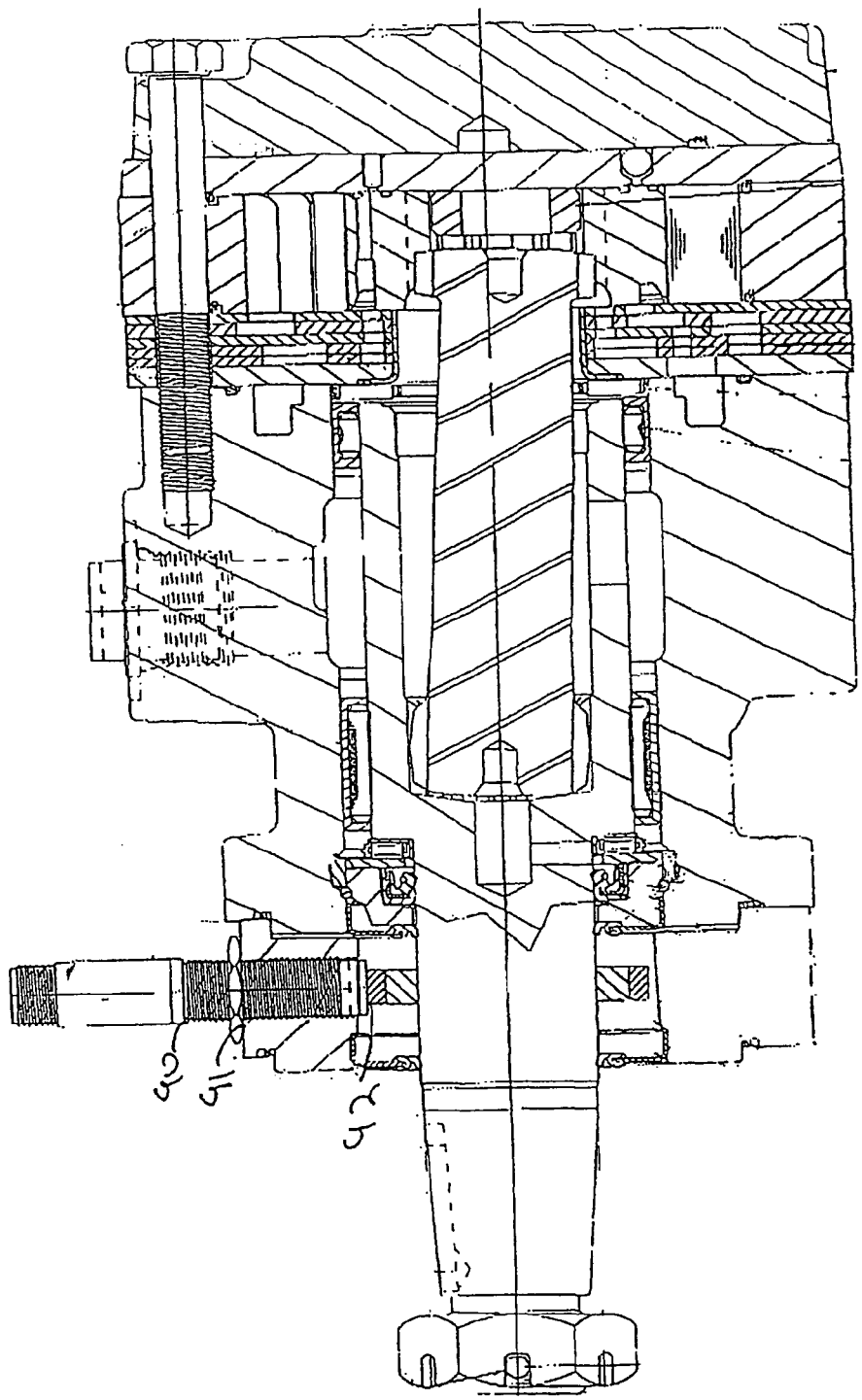

This invention relates to an improved sensor unit for a rotary shaft positioned by motor or otherwise. The invention will be described in its preferred embodiment of the sensor unit for a gerotor pressure device having a valve integral with the rotor (White model RE [FIGS. 1–6] and RS [FIGS. 7–10] designs). As understood, a gerotor pressure device will operate as either a motor or a pump, depending on the nature of its fluidic and mechanical connections. They are designed for a specified number of gallons per minute for a given displacement at high pressures up to 4000 psi. Other gerotor devices are spaced separate rotating valved, drive shaft valved, rotating rotor face valved and other such devices made by White, Eaton, Parker, Danfoss and others.

The gerotor pressure device 10 exemplified herein includes a power unit 15, an output shaft 20 and a sensor unit 30.

The power unit 15 serves to interconnect the rotation of the output shaft 20 to and/or from a interconnection to another device (not shown) with a gerotor pressure unit. This other device could be a pump (if the power unit was utilized as a motor), a motor (power unit pump) or another unit utilizing a hydraulic pressure differential.

In the particular embodiment disclosed, the power unit is a White model RE hydraulic motor having two ports 16, 17 for typical interconnection to a hydraulic pump/source of pressure through a series of valves (FIGS. 1–6—valves not shown).

The output shaft 20 serves to physically interconnect the power unit 15 to an object. This interconnection can provide rotary power to the object and/or accept rotary power from the object depending on the particular application involved. An output shaft separate from the power unit may be utilized.

In the particular embodiment disclosed, the output shaft 20 is integral with that of the power unit 15. This shaft is rotatedly interconnected directly to the housing 18 of the power unit by two spaced main bearings 21, 22. These bearings 21, 22 thus serve to physically mount the output shaft to the associated device through the power unit by providing the physical support thereof. In that this output shaft 20 is integral with the power unit 15, a main shaft seal 19 is incorporated in respect to the output shaft 20 so as to fluidically isolate the hydraulic pressure within the housing 18 of the power unit. This shaft seal thus serves to restrict the high pressure within the power unit 15. A separate thrust bearing 24 between a shoulder of the shaft 20 and the housing 18 of the power unit serves to maintain the output shaft 20 in axial position in respect to the power unit.

In the particular embodiment disclosed in FIGS. 1–6, the shaft is that of a White Model RE Motor having a shaft diameter of 1.3" with the cylindrical section extending some 1" from the front flange of the body 18 of the hydraulic gerotor motor (so as to provide an interactive surface for the later described support section 40 and seal 52). In the alternate embodiment of FIGS. 7–10 the device is a White Model RS Motor having a shaft diameter of approximately 1" with the cylindrical section extending substantially 0.7" from the flange to allow for cooperation with the sensor unit 30.

The invention of the present application relates to a sensor unit 30. This sensor unit 30 is designed to provide for a variety of functions in respect to the output shaft 20. These include aligning the sensor to the shaft, physically protecting the sensor and any associated seal against rocks and dirt on the outside of the device, providing for the use of differing sensors in a single sensor unit design, reliably orienting the sensor in respect to the output shaft, and allowing for the simplified manufacture/repair of sensor units. Each sensor 30 is chosen in response to the type of motor as well as the device to which it is to be attached. Preferably, this union is optimized to both the sensor as well as motor for example in FIG. 1–6 one side is utilized to match the RE mounting flange while this outside is designed for strength, maintenance and repair. This also allows existing parts of the RE—its bolt location, its internal lip and other factors this is preferable.

The particular sensor unit 30 disclosed has a body 32 with a central opening 34, a sensor cavity 37 and a mounting surface 45.

The body 32 of the sensor unit is for physically mounting the sensor in respect to the output shaft 20. The body 32 in addition physically protects the sensor from physical damage and outside contaminants. In the preferred single output shaft design, the body 32 is radially located directly by the shaft 20. It is held in position after initial operation by its physical connection to the power unit.

The central opening 34 of the sensor unit is utilized as the main alignment member for the sensor unit 30. The central opening provides for this alignment by having an inner support section 40 having an internal diameter 42 substantially the same as the diameter 23 of the output shaft. This inner support section 40 thus physically radially aligns the later described sensor with the shaft and/or anything mounted thereon when first installed. After the power unit 15 is installed, the body 32 of the sensor 30 is tightly captured between the hydraulic unit 15 and the frame 100 with which it is associated. It therefor cannot move in respect to either thereafter.

In the preferred embodiment disclosed, the distance between the inner support section 40 and an external mounting surface 45 (for sensor placement) is precisely defined in the manufacture of the sensor unit 30. This dimension is thus highly controlled providing for a reliable distance between the mounting surface 45 and the output shaft 20 during original manufacture. It is therefore not necessary to compensate for any misalignment within the sensor unit 30 such as by shims, adjustment screws, or other secondary adjustment means on initial installation nor anytime thereafter. After initial installation the sensor unit 30 does not move for it is not subject to any meaningful displacement forces. It therefore retains its initial, and precise, positioning—a positioning that further is common to all other output shafts using the same design power unit. A given sensor can therefor be exchanged with another without concern for any dimensions (as herein explained).

In the preferred embodiments disclosed the mounting surface 45 is 1.9" from the centerline of the shaft 20. The surface 45 itself is 0.7" wide and 2" long.

The cavity 37 is located on the inside of the body 32 of the sensor unit for physical mounting of the internal parts of the sensor in addition to any shaft mounted auxiliary components.

In the embodiment disclosed, the cavity 37 includes a seal cavity 49, the inner end 72 of the inside extension of the sensor 60 and a intermediate component 74 utilized between the output shaft 20 and the sensor 60.

The seal cavity is for the physical location of a secondary seal 52. This seal excludes external contaminants such as water and dirt from the cavity 37. Note the seal is oriented such that it in addition allows for any grease from the later described grease fitting 54 to exit the cavity 37 if such is pressurized relative to the normal atmosphere. This prevents over pressurization of the cavity (in addition to its previously described elimination of contaminants from the cavity). Note further that the inner support section 40, being located outside of the seal 52, serves to protect the seal 19 against dirt, rocks and other physical damage. It also similarly protects the sensor.

In the preferred embodiment disclosed in FIGS. 1–6, the body 30 of the sensor unit has a central hole 1.3" in diameter (for the shaft 20). The body section itself is substantially 3.6" high and 5.25" wide. The mounting surface 45 is substantially 1.9" from the centerline of the shaft. In the alternate embodiment of FIGS. 7–10 the support section 40 has an inner diameter of substantially 1" for its shaft and a width/height of substantially 3". Again, the mounting surface 45 for the sensor 60 is located 1.9" from the centerline of the shaft. A small O-ring type seal is located on the sensor surrounding the inside extension 70 so as to seal the sensor unit to the body 32.

The sensor 60 and intermediate component 75 in the embodiment disclosed provide for the actual position/rotation/direction sensing of the output shaft 20. This is preferred in that the intermediate component 75 increases the relative diameter of the output shaft 20 at the location of the sensor, thus increasing the accuracy of the sensing without requiring a concomitant increase in the diameter of the output shaft. The intermediate component in the preferred embodiment disclosed also provides for a single sensor 60 to be utilized with differing devices (contrast FIGS. 1–6 with FIGS. 7–10). In the preferred embodiment of FIG. 1–6 the intermediate component is a 50 pulse magnet ring having an inner diameter of 1.28" and an outer diameter of 2". It is substantially 0.25" wide. In the embodiment of FIGS. 7–10 the magnet rotor has an inner diameter of 1" with the same outer diameter and width as the first embodiment. This in combination with the commonality of distance of mounting surface 45 allows a single sensor 60 to be utilized interchangeably with both embodiments.

The sensor 60 itself includes a mounting member 64 and an inside extension 70.

The mounting member 64 serves to mount the sensor to the body 32 of the sensor unit 30. In the preferred embodiment disclosed, the mounting member 64 includes a support surface 67. This support surface 67 cooperates with the mounting surface 45 of the body of the sensor unit in order to physically interconnect the sensor 60 to such unit. This mounting is preferably removable so as to allow for the installation/replacement of the sensor without disassembly of the sensor unit 30 or the power unit with which it is utilized. This facilitates the initial construction and repair of the unit.

In the preferred embodiment disclosed, this removable mounting is provided by a series of mounting holes 65 through the mounting member 64, which holes allow for the use of screws 68 so as to removably connect the sensor 60 to the body 32 of the sensor unit.

It is preferred that some sort of indexing means exist between the sensor 60 and the body 32 of the sensor unit. In the embodiment disclosed this indexing is provided by the mounting holes 65 being offset from the longitudinal axis of the mounting member 64. This offset ensures that the mounting member 64 can only be assembled with the right orientation between the sensor 60 and the output shaft 20. Alternate means of providing for a set orientation can be provided by other indexing means such as location pins, orientation slots, or other unidirectional mounting schemes.

In the embodiments disclosed the mounting holes 65 are offset some 0.085" from the centerline of the mounting member 64 of the sensor.

The inside extension 70 of the sensor 60 serves to close the distance between the mounting surface 45 and the output shaft 20 (in the preferred embodiment disclosed the diameter of the output shaft expanded by distance 76 via the intermediate component 75).

The optional inside extension 70 of the sensor 60 has an inner end 72. The distance between the inner end 72 and the support surface 67 of the mounting member is a set distance 73, which set distance is selected to precisely locate the inner end 72 in a predetermined relationship in respect to the effective outer surface of the output shaft 20 (in the preferred embodiment as enlarged by the intermediate member). This set distance 73 thus cooperates with the inner support section 40 and its location of the mounting surface 45 so as to reliably and predictably control the critical dimension of the inner end 72 of the sensor to the effective outer diameter of the output shaft 20. For this reason, the inner end 72 of the sensor can be reliably and uniformly located during initial construction and/or subsequent repair without consideration for secondary adjustment. Further multiple sensors 60 are interchangeable without dimensional concern for a given sensor unit 30 (for shafts of corresponding nature).

In the preferred embodiment disclosed, the sensor 60 has an inside extension 70 some 0.88" long from its surface 67 to the end 72. The mounting member 64 itself has a width of substantially 0.65" and a length of substantially 1.7". It contains a hall-effect sensor with interconnections to ground, input voltage, output and direction. The inner end 72 of the sensor 60 is located within +0.3" of the ring magnet in both embodiments, this spacing determined by the gauss of the magnet and sensitivity of the hall-effect sensor.

Note that due to the use of the cooperation between a support surface 67 of the mounting member 64 and a mounting surface 45 of the body 32 a multiplicity of differing sensors can be utilized in a given design sensor unit. For example, a dual speed Hall sensor, an inductive proximity sensor, an optical sensor, or other sensor could be utilized with a single body 32 to provide for many differing applications while retaining the same construction (albeit in certain instances with a differing intermediate component). This again would be true of initial manufacture as well as subsequent field use.

The intermediate component 75 in the preferred embodiment serves to expand the relative diameter of the output shaft 20 as well as providing for a secondary unit for cooperation with the sensor 60 to establish the rotation/angle/direction of the output shaft 20 in respect to the sensor unit 30.

In the preferred embodiment disclosed, the intermediate member is a generally cylindrical magnet 77 located immediately surrounding the output shaft 20 spaced therefrom through a separation member 78. Preferably the intermediate component 75, whether the magnet 77 or other component, is fixedly mounted to the output shaft 20 so as to rotate therewith under all conditions. This intermediate component 75 extends off of the shaft 20 so as to expand its relative diameter at this location (by distance 76 disclosed). This allows for an effective shaft diameter differential for sensor location (mounting surface 45 at 40) and the set distance 73 of the inner end 72 of the sensor. Note that other intermediate components 75 could be utilized such as a gear having external slots (for use with an induction sensor or optical sensor), a segmented magnet having alternating north and south poles circumferentially about the member, or other expansion means capable of cooperating with a selected operation of sensor 60. In any event, the intermediate component 75 would be selected to go with the particular sensor to be utilized with the sensor unit 30. (Note however, that a given intermediate component such as the preferred magnet 77 could be utilized with differing sensors—for example a dual speed hall sensor instead of a single speed hall sensor).

Although the body 32 of the sensor unit is radially supported to the output shaft 20 precisely by the inner support section 40, it is preferred that the sensor unit 30, once installed, in addition be mounted in a fixed position in respect to the output shaft 20. In the preferred embodiment disclosed, this is accomplished by a flange 80 extending outwardly off of the body 32 of the sensor unit. The particular flange 80 disclosed has a series of holes therein matching the holes utilized to mount the power unit 15 to its auxiliary component (six holes shown in FIG. 2, four holes shown in FIG. 7). Note that the purpose of these holes is primarily to hold the sensor unit 30 in rotational orientation in respect to the housing 18 of the power unit after assembly. To facilitate this, the particular embodiment disclosed has a series of pressed steel sleeves 82 within the mounting holes 81. These sleeves 82 serve to pass the compression force between the power unit 15 and the component to which it is physically mounted, thus to prevent any compression effect including distortion on the body 32 of the sensor unit 30. Since the cooperation between the inner support section 40 and the shaft 20 initially locate the sensor 60, a purpose of the flange 80 is to thereafter retain the sensor unit 30 in respect to such shaft 20. This reduces considerations of wear from shifting the location of the mounting surface (i.e. once fixed the distance 46 remains constant after installation). Subsequent sensors 60 can therefore be substituted with this knowledge.

In the preferred embodiment the body 32 of the sensor unit 30 is made of plastic (Acetal disclosed) having an inner surface diameter 42 some 0.002-4" over the diameter 23 of the shaft 20. This precisely locates the mounting surface 45 in respect to the remainder of the device on installation. Once fixed in position on operation any high points/distortions would be removed by the wear by the steel shaft—a wear not compromising the initial relative location of the mounting surface in respect to the shaft 20.

As the distance 73 from the inner end 72 of the sensor 60 to its support surface 67 is set in manufacture, this distance is presubscribed. This distance is preferably within 0.017" for the set forth hall sensor (with consideration of the extension distance 76).

Due to the above any sensor 60 used with any sensor body meeting the standards will be properly dimensionally positioned for the shaft utilized therewith. No shimming measurements or other secondary operation is necessary on initial installation, repair or replacement.

Although the invention is described in its preferred embodiment with a certain degree of particularity, it is realized that numerous changes may be made without deviating from the invention.

What is claimed is:

1. A method for locating a sensor unit in respect to a device with a rotary shaft having a diameter, said method comprising providing a sensor unit comprising a body having a support section having an axial opening therethrough, the body further comprising a radial opening that extends from a periphery of the body towards the axial opening, the axial opening being substantially equal to the diameter of the rotary shaft, locating the sensor unit such that the axial opening receives the rotary shaft with said support section in contact with a radial outer surface of the rotary shaft, affixing the sensor unit to the device, and inserting a sensor into the radial opening.

2. The method of claim 1 characterized by the additional steps of forming a mounting surface on the sensor unit, providing a mounting member, and using the mounting surface and the mounting member to mount the sensor on the sensor unit.

3. The method of claim 1 characterized by the additional step of using a cavity to increase a diameter of the sensor unit adjacent to said support section.

4. The method of claim 3 characterized in that said cavity is located between said support section and the device.

5. The method of claim 4 characterized by the addition of locating a seal in said cavity between said sensor unit and the rotary shaft.

6. The method of claim 4 characterized by the addition of locating an intermediate component in said cavity to increase the relative diameter of the rotary shaft therein.

7. The method of claim 4 characterized in that there are at least two devices having differing diameter rotary shafts, and forming said support section to match the differing diameters of such shafts.

8. The method of claim 7 characterized by forming the sensor units with the same distance between the mounting surface and the axis of rotation of the respective shaft.

9. The method of claim 8 characterized by the additional step of using cavity to increase a diameter of the sensor unit adjacent to said support section.

10. An improved sensor unit for a device having a rotary shaft with a diameter, said sensor unit having a body, said body being fixedly mounted to said device, a sensor, said sensor being fixedly mounted to said body and disposed radially with respect to such shaft, said sensor having an inner end, an intermediate component and said intermediate component being mounted on the shaft between such shaft and the inner end of said sensor increasing the relative diameter of such shaft.

11. The improved sensor unit of claim 10 characterized in that the sensor unit may be utilized with alternative devices having differing diameter shafts, said intermediate component having an outer diameter, and said outer diameter being the same no matter what alternative device such sensor unit is utilized with.

12. The improved sensor unit of claim 11 characterized in that said intermediate component has an inner diameter and an outer surface, such inner diameter matching the diameter of the shaft, said outer surface of said intermediate component being spaced from said inner diameter thereof, and said inner end of said sensor being located adjacent to said outer surface of said intermediate component.

13. The improved sensor unit of claim 10 characterized in that said sensor is exchangeable without adjustment.

14. The improved sensor unit of claim 10 characterized in that said intermediate component has an inner diameter and an outer surface, such inner diameter matching the diameter of the shaft, said outer surface of said intermediate component being spaced from said inner diameter thereof, and said inner end of said sensor being located adjacent to said outer surface of said intermediate component.

15. The improved sensor unit of claim 14 characterized in that said inner end of said sensor is located radially outwards of said outer surface of said intermediate component.

16. The improved sensor unit of claim 10 characterized in that said body has a mounting surface, said sensor has a mounting member, and said mounting member of said sensor being removably connected to said mounting surface.

17. The improved sensor unit of claim 10 characterized in that said body has a support section, and said support section being in contact with the rotary shaft.

18. The improved sensor unit of claim 17 characterized in that said body has a cavity, said cavity being located adjacent to said support section, and said intermediate component being located in said cavity.

19. The improved sensor unit of claim 18 characterized in that said cavity is between said support section and the device.

20. The improved sensor unit of claim 19 characterized by the addition of a seal, said seal being located in said body surrounding the shaft and said seal being located between said support section and said cavity.

21. A sensor unit for a shaft comprising a body and a sensor, said body locating said sensor in respect to the shaft, said body having a seal cavity and a central opening to an outside surface, said seal cavity having a diameter larger than said central opening and said seal cavity being on the opposite side of said central opening as said outside surface.

22. A sensor unit for a device having a rotary shaft, the sensor unit comprising:
   a body configured to fixedly mount to an associated device having a rotary shaft, the body having a mounting surface and an opening configured to receive the rotary shaft of the associated device;
   a sensor;
   a mounting member, the sensor being connected to the mounting surface by the mounting member; and
   indexing means between the mounting surface and the mounting member to orient the sensor in respect to the body.

23. The improved sensor of claim 22 characterized in that said indexing means includes means offset from a central axis of said mounting member.

24. The improved sensor of claim 23 characterized in that said means offset are holes in said mounting member aligned with holes in said mounting surface.

25. The improved sensor of claim 22 characterized by said mounting surface having a plane being substantially perpendicular to the central axis of said sensor.

* * * * *